July 9, 1957 W. T. KELLEY ET AL 2,798,622
TRUCK LOADING AND UNLOADING APPARATUS WITH LEVELING MEANS
Filed Sept. 10, 1956 3 Sheets-Sheet 1
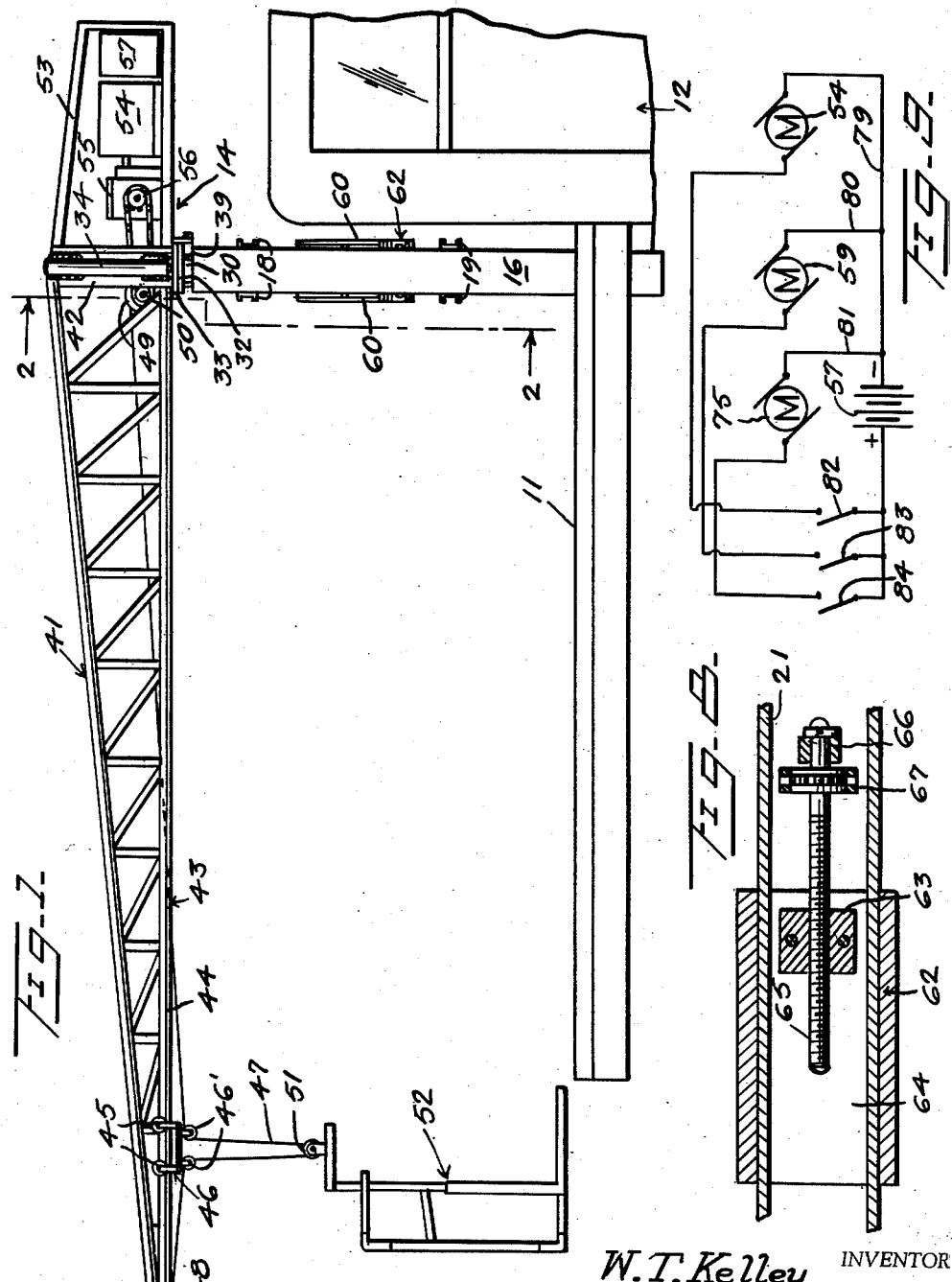
INVENTORS
W. T. Kelley
W. L. Kiper
BY John N. Randolph
ATTORNEY

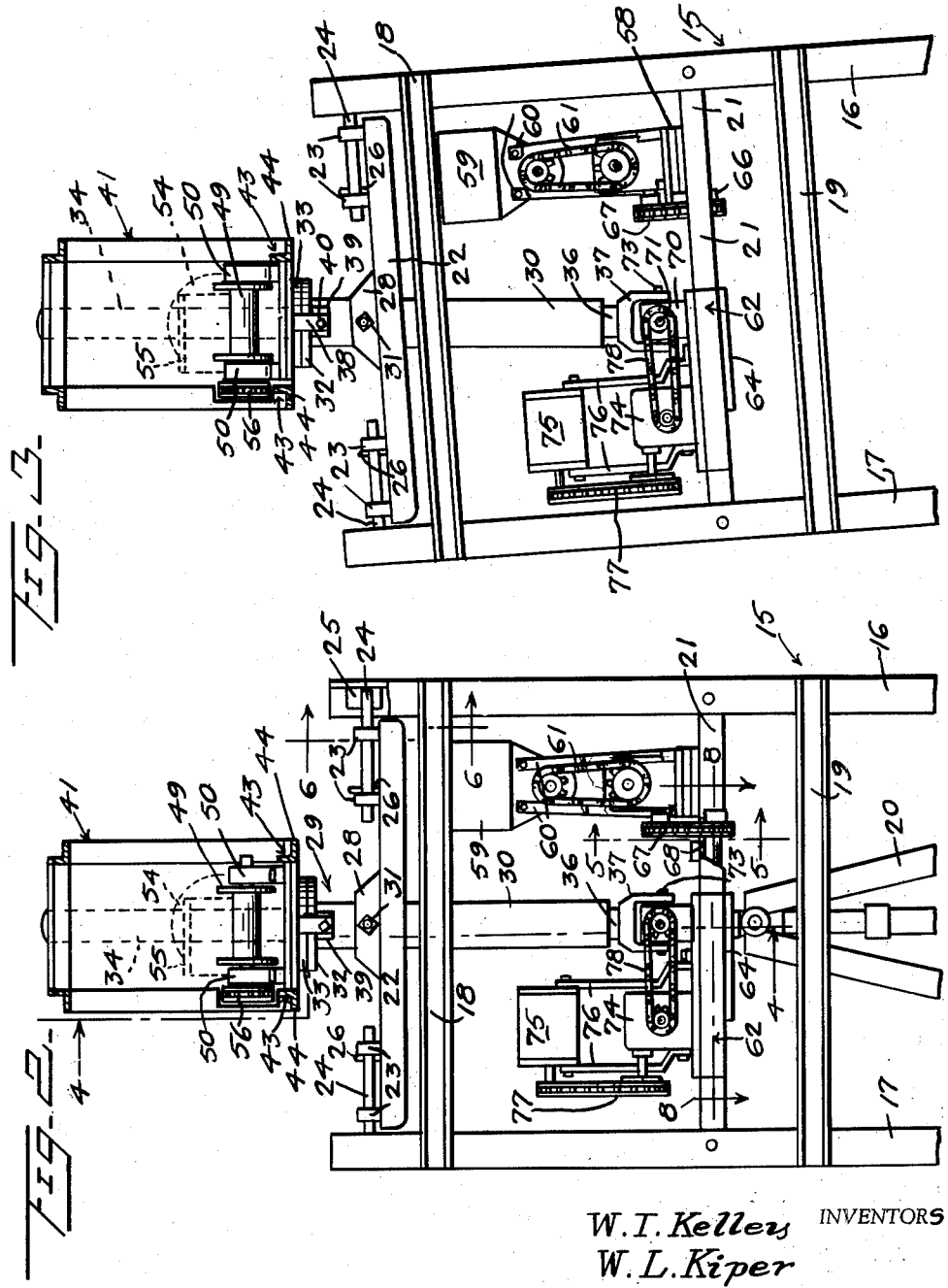

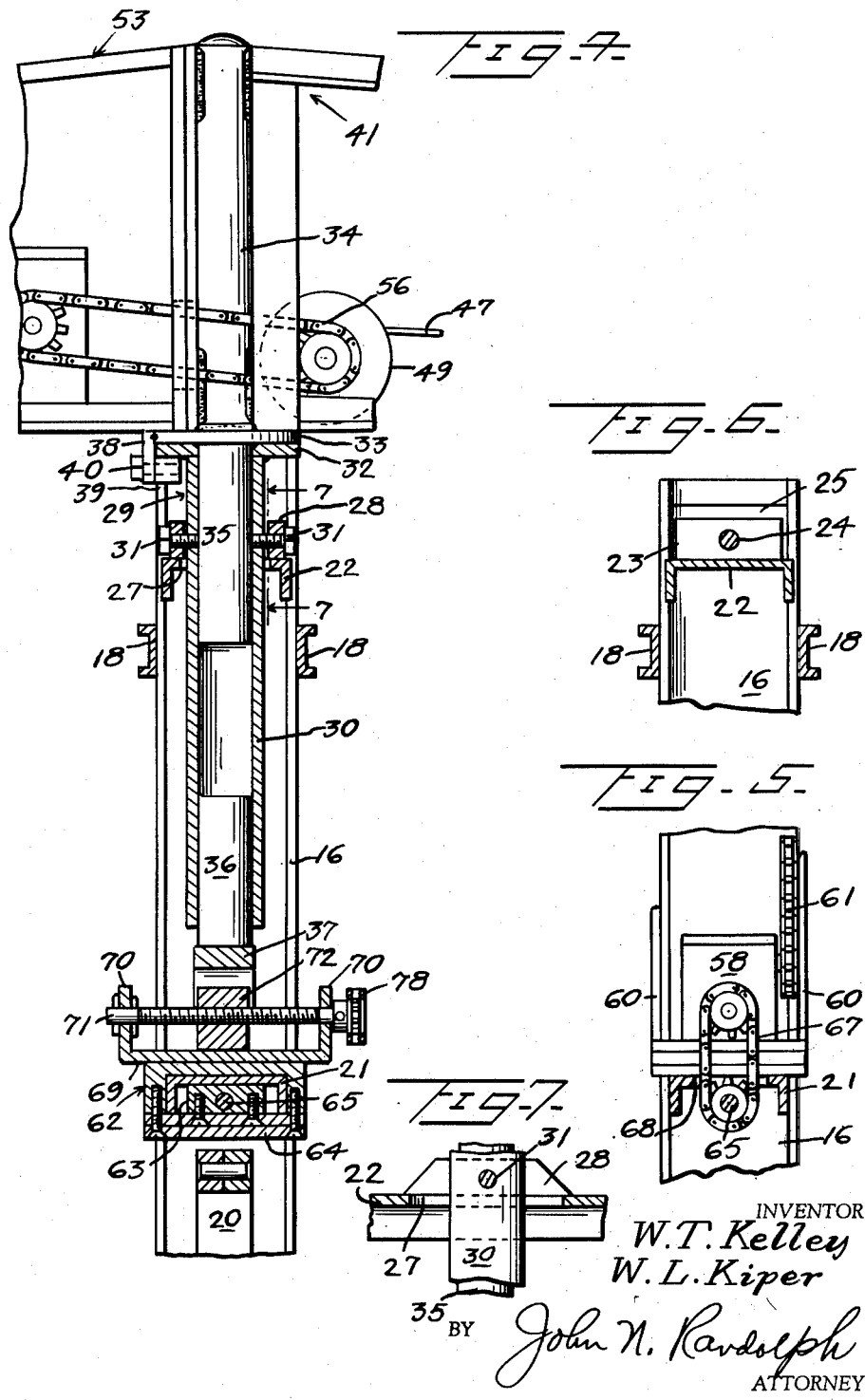

United States Patent Office 2,798,622
Patented July 9, 1957

2,798,622

TRUCK LOADING AND UNLOADING APPARATUS WITH LEVELING MEANS

Walter T. Kelley, Clarkson, and Wilbur L. Kiper, Leitchfield, Ky.; said Kiper assignor to said Kelley Application September 10, 1956, Serial No. 608,818

6 Claims. (Cl. 214—75)

This invention relates to a novel loading and unloading apparatus for trucks and more particularly to a novel means to effect a tilting of a part of the apparatus relative to the truck for leveling a part of the apparatus.

More particularly, it is an object of the present invention to provide a loading and unloading apparatus including a swingably supported boom which is capable of swinging through an arc of either 180° or 360° and which apparatus includes means for leveling the boom when extending in any direction with respect to the truck or supporting vehicle of the apparatus.

Still a further object of the invention is to provide a loading and unloading apparatus wherein the leveling means may be employed for positioning the boom at an incline whereby a load supported by a trolley or carriage which is movable longitudinally of the boom may be conveyed either toward or away from the truck, at the will of the operator, down the inclined boom to avoid the manual labor normally involved in pushing or pulling the load lengthwise relative to the boom.

Various other objects and advantages of the invention will hereinafter become more fully apparent from the following description of the drawings, illustrating a presently preferred embodiment thereof, and wherein:

Figure 1 is a fragmentary side elevational view of a portion of a truck and with the loading and unloading apparatus shown mounted thereon;

Figure 2 is an enlarged fragmentary vertical sectional view, taken substantially along a plane as indicated by the line 2—2 of Figure 1;

Figure 3 is a view similar to Figure 2 but showing a part of the loading and unloading apparatus tilted laterally in one direction;

Figure 4 is an enlarged vertical sectional view, taken substantially along a plane as indicated by the line 4—4 of Figure 2;

Figure 5 is an enlarged vertical sectional view, taken substantially along a plane as indicated by the line 5—5 of Figure 2;

Figure 6 is an enlarged vertical sectional view, taken substantially along a plane as indicated by the line 6—6 of Figure 2;

Figure 7 is a fragmentary vertical sectional view, taken substantially along a plane as indicated by the line 7—7 of Figure 4;

Figure 8 is an enlarged fragmentary horizontal sectional view, taken substantially along a plane as indicated by the line 8—8 of Figure 2, and Figure 9 is a diagrammatic view of an electric circuit for the apparatus.

Referring more specifically to the drawings, a portion of a conventional truck is illustrated in Figure 1 including the truck bed 11 and the rear part of the truck cab 12.

The loading and unloading apparatus, designated generally 14, includes a frame, designated generally 15. The frame 15 has substantially parallel uprights 16 and 17 which are preferably of channel shape construction and with the channels thereof opening inwardly. The uprights 16 and 17 are rigidly connected in spaced apart parallel relation to one another by upper and lower cross braces 18 and 19, respectively, which are secured to the outer sides of the flanges of the uprights 16 and 17. The supporting frame 15 is mounted on the forward part of the truck bed 11, crosswise thereof and behind and adjacent the cab 12. The uprights 16 and 17 extend downwardly through the truck bed 11 and are preferably mounted for sliding movement therethrough. The frame 15 may be raised and lowered relative to the truck bed 11 by a suitable ram or jack 20, an upper part only of which is illustrated in Figure 2 and which constitutes no part of the present invention. The frame 15 also includes a crossbar 21 which is secured at its ends in the uprights 16 and 17 and which is disposed between the upper and lower braces 18 and 19, above and spaced from the upper end of the jack or ram 20. The frame 15 also includes a relatively wide bar 22 which, like the bar 21, is preferably of inverted channel shape in cross section, as seen in Figure 4. The ends of the bar 22 are spaced inwardly from the uprights 16 and 17, as seen in Figures 2 and 3, and said bar 22 is provided with upstanding apertured lugs 23. A pair of the apertured lugs 23 are located adjacent each end of the bar 22 and each of said pairs of lugs accommodates a rod 24 which is disposed turnably and slidably therein. The rods 24 extend beyond the ends of the bar 22 and have outer ends journaled in bearing blocks 25 which are secured in the channels 16 and 17, as seen in Figures 2 and 6. The rods 24 are disposed in longitudinal alignment with one another and midway between the side edges of the bar 22 for supporting said bar for rocking movement therebeneath about an axis disposed above and longitudinally of the axis of said bar 22. Each of the rods 24 may be provided with retaining pins 26 for retaining said rods in engagement with the pairs of lugs 23 and the journal blocks 25. The bar 22 is provided with an elongated rectangular opening 27 midway of its ends, as seen in Figures 4 and 7, and has upstanding flanges 28 straddling said opening 27 and disposed longitudinally of the bar 22.

A mast, designated generally 29, as best seen in Figure 4, includes a lower tubular section 30 which extends loosely through the opening 27 and between the upright flanges 28 and which has a lower end terminating above and spaced from the crossbar 21. Journal elements 31 extend inwardly through the flanges 28 and are detachably anchored in the tubular mast section or sleeve 30 and are journaled in said flanges 28 to permit the mast 29 to rock longitudinally relative to the bar 22 and transversely with respect to the vehicle 11, 12, about said journal elements 31. An annular collar 32 is fixed to and extends outwardly from the upper end of the tubular mast section 30 and is disposed above and spaced from the flanges 28. An annular collar 33 is disposed around and secured to an upper section 34 of the mast 29 and is spaced from the ends of said upper mast section 34. The upper mast section 34 is preferably in the form of a solid shaft of substantial strength which is of circular cross section. The lower portion 35 of the upper mast section 34 is swivelly disposed in the upper portion of the mast section 30 and the collar 33 thereof rests on and is adapted to swivel relative to the collar 32. The mast 29 also includes a stem 36 which is swivelly and slidably mounted in the lower portion of the mast section 30 and which extends downwardly therefrom. The stem 36 has a yoke 37 projecting from its lower end and which is disposed between the lower end of the mast section 30 and the crossbar 21. A hanger bar 38 is secured to a portion of the periphery of the upper collar 33 and extends downwardly therefrom to below the collar 32. A lug 39 is disposed on the inner side of the lower portion of the hanger 38 and is detachably secured thereto by a fastening 40 which extends inwardly through said hanger and is detachably anchored in the lug 39. The lug 39 bears against the underside of the collar 32 to retain the mast sections 30 and 34 swivelly connected and to permit disconnection of said mast sections by removal of the fastening 40.

An elongated boom 41, which may be twenty or more feet in length, includes an upright inner end portion 42 which abuts against a part of the upper mast section 34, which extends upwardly from the collar 33, and which is suitably anchored thereto. The boom 41 includes spaced substantially parallel bottom members 43 of angular cross section and which are disposed at a right angle to the axis of the mast 29. Each of said bottom members has an outwardly extending bottom flange 44 forming a rail. Each of said rails is engaged by a pair of wheels or rollers 45 forming a part of a trolley 46 which is suspended beneath said rails for movement longitudinally of the boom 41 and which trolley is provided with a pair of longitudinally spaced depending pulleys 46'. A cable 47 has one end anchored at 48 to the outer end of the boom 41 and has an opposite inner end wound on a drum or reel 49 which is journaled in bearings 50 in the inner part of the boom 41. A part of the cable 47 extends downwardly from between the two pulleys 46' and passes under a pulley 51. The pulley 51 is connected to and extends upwardly from a loading gripping or clamping device 52 of any conventional construction which is thus suspended beneath the carriage or trolley 46 for free swinging movement relative thereto. Any type of article gripping or holding device may be employed and which may vary substantially depending upon the type of load to be gripped or held thereby.

An elongated supporting box or frame 53 is disposed in alignment with the boom 41 and has an inner end abutting against and secured to the upper portion of the upper mast section 34, as seen in Figure 1. A motor 54 is supported by the box or frame 53 for rotating the drum 49 through a reduction gear unit 55, which is supported by the box or frame 53, and a sprocket or chain drive 56. The motor 54 is reversible for revolving the drum 49 in either direction. The motor 54 is preferably an electric motor and a storage battery 57 may be supported in the box 53 for furnishing electric current to the motor 54.

A reduction gear unit 58 is supported on and secured to the crossbar 21, adjacent one end thereof. An electric motor 59 is supported above the reduction gear unit 58 by supporting standards 60 which extend downwardly therefrom and are secured to the bar 21. The drive shaft of the motor 59 is connected to the input shaft of the reduction gearing 58 by sprocket wheel and chain drive 61.

An elongated box-like slide 62 is reciprocably mounted on the bar 21 between the reduction gearing 58 and the upright 17, which is disposed remote therefrom. A nut 63 is secured to a detachable bottom section 64 of the slide 62, as best seen in Figure 4, and has a feed screw 65 extending threadedly therethrough. The feed screw 65 is journaled in a bearing 66 which is secured to the underside of the top portion of the crossbar 21. The feed screw 65 is connected to the output shaft of the reduction gear unit 58 by a sprocket wheel and chain drive 67 which extends through an opening 68 in the crossbar 21 and which is connected to the feed screw 65 between the bearing 66 and slide 62, and adjacent said bearing.

A bar 69 is disposed crosswise of and is secured on the upper side of the slide 62, near the end thereof which is disposed adjacent the sprocket wheel and chain drive 67. The bar 69 has upstanding apertured ends 70 forming bearings for journaling unthreaded end portions of a feed screw 71 which extends therebetween. A nut 72 is threadedly mounted on the screw 71 between the bearings 70 and has laterally projecting trunnions 73 which are journaled in the sides of the yoke 37, which straddle the nut 72. A gear reduction unit 74 is mounted on and secured to the opposite end of the slide 62 and an electric motor 75 is supported above the reduction gear unit 74 by standards 76 which extend upwardly from the slide 62. The shaft of the motor 75 is connected to the input shaft of the gear reduction unit 74 by a sprocket wheel and chain drive 77 and the output shaft of said reduction gearing 74 is connected by a sprocket wheel and chain drive 78 to the feed screw 71, beyond one of the bearings 70. The motors 59 and 75 also constitute reversible motors.

Figure 9 illustrates a wiring diagram wherein the electric motors 54, 59 and 75 are connected by separate electric circuits 79, 80 and 81, respectively, to the battery 57 and which circuits are provided with switches 82, 83 and 84, respectively for making and breaking the circuits to the electric motors and for controlling the motors so that the motors can be operated in either direction. The switches 82, 83 and 84 are preferably mounted on the load gripping device 52 so that the motors can be controlled by the operator who also operates the gripper or clamp 52.

It will be readily apparent that the boom 41 can be swung with the upper mast section 34 relative to the lower mast section 30 through an arc of 360° from its position as seen in Figure 1, extending rearwardly from the mast and which constitutes the normal position of the loading and unloading apparatus 14 when not in use. The boom 41, in the normal use of the apparatus 14, is swung to a position adjacent an article or the load, not shown, to be loaded or unloaded by the apparatus 14 onto or off of the truck bed 11, respectively. The trolley 46 with the clamp 52 suspended therebeneath is moved longitudinally of the boom 41 to properly position the clamp 52 adjacent the load and said clamp is raised or lowered to a position where it can be engaged with the load by operation of the switch 82 for causing the motor 54 to be driven in a desired direction to turn the drum 49 for either winding the cable 47 thereon or for paying out the cable therefrom. After the load is gripped by the clamp 52 the switch 82 is manipulated to cause the motor 54 to turn the drum 49 in a direction for winding the cable 47 thereon to elevate the clamp 52 and the load supported thereby. The usual procedure is to then manually push or pull the clamp 52 to cause the trolley 46 to travel longitudinally of the boom 41 to move the clamp 52 to a position to load the article carried thereby onto the bed 11 or to unload the article therefrom. However, this requires considerable manual effort and it is especially arduous where the boom 41 is disposed at an incline, as usually occurs, and the trolley 46 must be pushed or pulled up the inclined boom.

The leveling apparatus of the present invention enables the rails 43 of the boom 41 to be leveled irrespective of the direction that the boom extends from the mast 29, relative to the vehicle 11, 12. For example, if the vehicle is laterally inclined so that the right side of the vehicle is higher than the left side thereof, the operator from a position adjacent the clamp 52 by actuating the switch 83 can effect operation of the motor 59 in a desired direction to turn the feed screw 65 so that the slide 62 will move toward the upright 17 from its position of Figure 2 to its position of Figure 3 to thus position the mast 29 vertically even though the frame 15 is inclined, as seen in Figure 3, so that the boom 41 will be level. The mast 29 can also be swung in the opposite direction about its pivot 31 if the frame 15 is inclined to the right rather than to the left. It will also be apparent that the stem 36 will slide outwardly of the mast section 30 as said mast is swung in either direction from its position of Figure 2 to accommodate the necessary extension of the mast between the pivot 31 and the trunnions 73. Similarly, if the vehicle 11, 12 is inclined lengthwise so that one end of the vehicle is higher than the other, the switch 84 is actuated to effect operation of the motor 75 for turning the feed screw 71 in a desired direction to cause lengthwise movement of the nut 72 relative to the feed screw 71 for rocking the mast 29 either to the right or left as seen in Figure 4. To accommodate this rocking movement, the bar 22 swings with the mast 29 about the pivots 24. Thus, said bar 22 and its pivots 24 and 31 which are disposed at right angles to one another form a universal joint. Additionally, the connection of the yoke 37 by the trunnions 73 to the nut 72 and the swivel mounting of the stem 36 in the mast section 30 provides a second universal joint in addition to an extensible connection. These two universal joints and the extensible connection permit universal adjustment of the mast 29 relative to the frame 15 for leveling the boom 41 irrespective of the incline at which the truck may be disposed by swinging of the mast 29 relative to the frame 15 about its two pivots 24 and 31.

The leveling mechanism as aforedescribed in addition to providing means for leveling the boom 41, irrespective of the incline at which the truck may be setting or the direction that the boom extends from the truck, can additionally be utilized to eliminate the manual labor involved in pushing or pulling a load supported by the clamp 52 lengthwise along the boom 41 either toward or away from the truck bed 11. Assuming that the boom 41 has been previously leveled, that the clamp has been moved to a position to engage the load and that the switch 82 has then been actuated to cause the drum 49 to be turned by the motor 54 in a direction to raise the clamp 52 and the load supported thereby, the operator from his position at the clamp 52 can then operate either the switch 83 or 84 to effect operation of either the motor 59 or 75 to cause the boom 41 to be tilted from its horizontal position. For example, if the load carried by the clamp is to be loaded on the bed 11, the mast 29 is rocked, as previously described, so that the outer end of the boom 41 will be raised to cause the trolley 46 to coast down the rails 44 toward the mast 29 for positioning the clamp 52 over a part of the truck bed 11, so that said clamp can then be lowered and the load supported thereby unloaded onto the truck bed. Similarly, the boom 41 can be tilted so as to be inclined outwardly and downwardly to cause the trolley 46 to roll or coast toward the outer end of the boom for unloading from the truck bed 11.

Various modifications and changes are contemplated and may be resorted to without departing from the function or scope of the invention as hereinafter defined by the appended claims.

We claims as our invention:

1. In combination with a truck, a loading and unloading apparatus for the truck comprising a frame mounted on and extending upwardly from a part of the truck, a mast mounted in and extending upwardly from the frame, a boom having an inner end secured to an upper portion of the mast and extending therefrom, said boom being disposed at substantially a right angle to the mast, the boom supporting portion of the mast being swivelly mounted relative to another part of the mast which is connected to said frame for swinging movement of the boom in either direction, a trolley supported by said boom for movement longitudinally thereof, a load gripping device, hoist means supported by said boom including a part extending downwardly from the trolley and connected to said gripping device for raising and lowering the gripping device relative to the trolley and boom, means supported by said frame and connected to the mast for rocking the mast in a plurality of directions relative to the frame for leveling and tilting the boom, said means including a universal joint connecting the mast to the frame, said universal joint being disposed beneath and adjacent the boom and being connected to said part of the mast which is connected to the frame, said universal joint forming a part of the frame, said means including a first feed screw means and a second feed screw means, each of said feed screw means connecting the mast and frame, said first and second feed screw means being disposed at right angles to one another and being individually operable for rocking the mast relative to said universal joint about two axes disposed at right angles to one another, and a slide reciprocably supported by a part of said frame, said second feed screw means being supported by said slide and directly connected to a lower end of the mast for swinging movement of the mast by operation of said second feed screw means in a direction crosswise of the direction of sliding movement of said slide relative to the frame, and said first feed screw means being supported by said frame and connected to the slide for reciprocating the slide to rock the mast in a direction corresponding to the direction of reciprocating movement of the slide.

2. An apparatus as in claim 1, said mast including a swivelly and telescopically mounted lower end portion, said second feed screw means including a nut mounted for movement crosswise of the slide and to which the lower end of said lower portion of the mast is pivotally connected and combining therewith to form a second lower universal joint and extensible mast section.

3. An apparatus as in claim 2, a separate power source forming a part of each feed screw means, and means for selectively controlling the operation of said power sources for turning the first feed screw means and second feed screw means selectively and in either direction for rocking the mast in either direction relative to the frame about either pivot axis of said first universal joint.

4. A loading and unloading apparatus comprising a frame adapted to be mounted on and to extend upwardly from a transporting vehicle, a universal joint forming a part of and disposed adjacent an upper end of the frame, a mast having an intermediate section connected to said universal joint for rocking movement therein and therewith relative to the remainder of the frame about two axes disposed at right angles to one another, an upper mast section swivelly supported by and extending upwardly from said intermediate mast section, a boom connected to and extending from the upper mast section and disposed at substantially a right angle to the axis of the mast, said mast including a swivelly and extensibly mounted lower section forming a second universal joint, and means supported by said frame connected to said second universal joint and operable for moving said second universal joint in a plurality of directions for selectively rocking the mast about either of the axes of swinging movement of the mast afforded by the first universal joint for tilting the mast in a plurality of directions relative to the frame for leveling said boom or for effecting a lengthwise tilting of the boom.

5. An apparatus as in claim 4, and load elevating and conveying means supported by and movable longitudinally of the boom, said elevating and conveying means being caused to coast lengthwise of the boom toward or away from the frame when the boom is tilted longitudinally.

6. An apparatus as in claim 4, said means including a slide reciprocably supported by a part of said frame, a first feed screw means connected to the frame and slide for reciprocating the slide relative to the frame, and a second feed screw means supported by the slide and directly connected to the lower mast section and operable for swinging the mast relative to the frame in a direction crosswise of the direction of sliding movement of the slide.

References Cited in the file of this patent

UNITED STATES PATENTS

| 2,645,360 | Raymond | July 14, 1953 |
| 2,646,180 | Schlough et al. | July 21, 1953 |
| 2,755,943 | Payne et al. | July 24, 1956 |
| 2,772,795 | Cramer et al. | Dec. 4, 1956 |

FOREIGN PATENTS

| 306,927 | Switzerland | July 1, 1955 |
| 743,092 | Great Britain | Jan. 11, 1956 |